United States Patent [19]

Firtion et al.

[11] Patent Number: 5,323,191
[45] Date of Patent: Jun. 21, 1994

[54] COMPOSITE OPHTHALMIC LENSES

[75] Inventors: Eric Firtion, Fontainebleau; David Henry, Saint Michel sur Orge; Jean-Jacques Theron, Fontainebleau; Andre J. Vachet, La Genevraie; Jacques J. Vial, Noisy s/Seine, all of France

[73] Assignee: Corning Incorporated, Corning, N.Y.

[21] Appl. No.: 907,116

[22] Filed: Jul. 1, 1992

[30] Foreign Application Priority Data

Jul. 12, 1991 [FR] France ................... 91 08831

[51] Int. Cl.⁵ .................................. G02C 7/02
[52] U.S. Cl. ........................ 351/159; 351/166
[58] Field of Search ............. 351/159, 163, 166

[56] References Cited

U.S. PATENT DOCUMENTS

| 4,268,134 | 5/1981 | Gulati et al. | 351/163 |
|---|---|---|---|
| 4,592,947 | 6/1986 | Hunter et al. | 428/212 |
| 4,793,703 | 12/1988 | Fretz, Jr. | 351/163 |
| 4,857,407 | 8/1989 | Coleman et al. | 428/412 |
| 5,064,712 | 11/1991 | Fretz, Jr. | 428/212 |
| 5,116,684 | 5/1992 | Fretz, Jr. et al. | 428/417 |

FOREIGN PATENT DOCUMENTS

| 0077168 | 5/1982 | European Pat. Off. |
|---|---|---|
| 0083017 | 12/1982 | European Pat. Off. |
| 0116924 | 11/1984 | European Pat. Off. |
| 0295596 | 6/1988 | European Pat. Off. |

Primary Examiner—Scott J. Sugarman
Attorney, Agent, or Firm—C. S. Janes, Jr.

[57] ABSTRACT

This invention is directed to the production of glass-plastic lenses consisting of a thin glass element bonded to a relatively thick transparent lens or lens preform made of poly(diethylene glycol)bis(allyl carbonate) by a transparent thermoset, polyurethane adhesive layer of optical quality having an elongation at rupture of at least 200% and an elastic modulus in the range of 0.13–10 MPa and at 100% elongation.

13 Claims, No Drawings

1

COMPOSITE OPHTHALMIC LENSES

RELATED APPLICATION

U.S. application Ser. No. 07/907/110, filed concurrently herewith by D. Henry et al. under the title NEW COMPOSITE OPHTHALMIC LENSES AND THEIR MANUFACTURE and assigned to the assignee of the present application, discloses the preparation of glass-plastic composite lenses consisting of a transparent thermoset polymer exhibiting an index of refraction of at least 1.58 and a thin glass element of essentially constant thickness adhered to the front surface of the polymer without the use of an adhesive.

BACKGROUND OF THE INVENTION

The invention relates to a glass-plastic composite ophthalmic lens.

Composite lenses which contain a thin layer of glass bonded by a transparent adhesive to a relatively thick lens made of transparent plastic material have already been proposed in the patent literature.

For example, EP-A 0 182 503 [which corresponds to U.S. Pat. No. 4,679,918 (Ace)] describes a composite lens containing a glass lens, for example, a photochromic glass lens, and a lens made of plastic material whose radii of curvature of the surfaces facing each other are different; these lenses are joined by a relatively thick intermediate layer of adhesive elastomer material of optical quality capable of great elongation, for example, approximately 400%. The silicone elastomers are the only adhesive elastomer materials described.

The problem posed by the manufacturing of composite lenses of the above-mentioned type and which the aforementioned documents attempt to solve is that of obtaining such composite lenses which are capable of resisting the variations of temperature to which these lenses are subjected when in service. This problem is difficult to overcome because of the great difference existing between the thermal expansion coefficients of the glass and of the plastic material, which makes the differential expansion high between the plastic material and the glass and causes the thin layer of glass to break when the lens is subjected to temperature variations when one uses an ordinary adhesive, such as an epoxy resin of optical quality, to bind the glass layer to the plastic lens.

The problem considered above is particularly hard to solve when the plastic lens consists of poly(diethylene glycol bis(allyl carbonate)), which is a plastic material widely used in the manufacturing of ophthalmic lenses, sold by the company PPG Industries, Pittsburgh, Pa., under the commercial designation CR39®. CR39® actually exhibits a linear thermal expansion coefficient which is more than 10 times higher than that of mineral glasses of optical quality.

The solution proposed by the aforementioned documents in an attempt to solve this problem is based on the use, as adhesive, of a silicone elastomer with a high elongation at rupture in order to minimize the stresses generated in the composite lens by the differential thermal expansion between the glass and the plastic material.

This solution is nevertheless not entirely satisfactory because it does, not take into account the long-term effect of humidity which particularly tends to degrade the properties of transparency and elongation of the adhesive. In effect, the adhesives of the silicone type have a pronounced hydrophobic nature and do not dissolve in water. Any water present forms a two-phase system with the adhesive, which gives the layer a milky and diffusing, and therefore redhibitory, aspect. Moreover, the theoretical approach on which the proposed solution is based, is inexact. In effect, the aforementioned documents consider that the phenomenon of thermal expansion to which the lens is subjected is that of the simple variation of the diameters of two flat disks, free to expand, whereas one is in the presence of elements with curved surfaces. The aforementioned documents also neglect the effect that can occur when one mounts composite lenses on a frame, for example a metallic frame, of glasses. Mounting the lenses in effect is usually done on the plastic part of the lens which limits the increase of the diameter of the lenses when they are exposed to a relatively high temperature. Consequently, the radius of curvature of the part made of plastic material has a tendency to decrease (bulging effect), with the result that the stresses on the edges of the lenses increase more than could be expected from a simple calculation of variation of the diameters. The humidity also has a similar effect to that of thermal expansion, which is therefore added to that of thermal expansion, aggravating the destructive phenomenon observed.

In any case, the applicants have no knowledge that the composite lenses described in the aforementioned documents have been commercialized, and this is probably because of the fact that these lenses do not have an entirely satisfactory behavior in the long term.

The applicants, therefore, undertook intensive research and found that an essential property for the material of the intermediate adhesive layer, besides a great elongation capability, was a low elastic modulus, namely, an elastic modulus of at most 1.0 MPa with 100% elongation. Therefore, the applicants, research was directed to minimizing the stresses undergone by the thermosetting polyurethanes of optical quality, which normally have an elastic modulus much higher than the maximum value mentioned above, by modifying their composition so as to lower their elastic modulus below this value.

SUMMARY OF THE INVENTION

The object of the present invention is, therefore, to provide new glass-plastic composite ophthalmic lenses which are capable of resisting great temperature variations and the long-term effects of humidity.

More particularly, the invention relates to composite lenses which include a thin glass element connected by a transparent adhesive layer, of optical quality, with an elongation at rupture of at least 200%, to a relatively thick transparent element made of poly(diethylene glycol bis(allyl carbonate)) which is a lens or a lens preform, characterized by the fact that said adhesive has an elastic modulus in the range from 0.13 to 1.0 MPa at 100% elongation.

The thin glass element can, if desired, bear a polarizing layer previously applied to the surface of the glass element turned towards the transparent adhesive layer. This optional polarizing layer can be applied as described in French Patent No. 2 568 568 filed Aug. 1, 1984, which corresponds to U.S. Pat. No. 4,648,925 (Goepfert et al.).

According to one embodiment, the highly extensible transparent adhesive is chosen from among the segmented, optical quality, thermoset polyurethanes of the type with hard and soft segments, obtained from a composition of thermosetting polyurethane modified by addition of a small quantity of chain termination agent, thereby limiting the density of crosslinking, and reducing the elastic modulus at 100% elongation of the resulting thermoset polymer to a value from 0.13 to 1.0 MPa, preferably from 0.3 to 0.7 MPa.

The compositions of optical quality, thermosetting, segmented polyurethanes of the type with hard and soft segments include, in a known manner, an entirely aliphatic diisocyanate, a poly(oxyalkylene)diol with molecular weight of approximately 600 to 3500, and a chain elongation agent consisting of a higher triol or polyol possibly mixed with a diol, and preferably an appropriate catalyst.

Examples of useful aliphatic isocyanates are particularly 4,4'-methylene-biscyclohexylisocyanate, isophoronediisocyanate, cyclohexane-1,4-diisocyanate, hexamethylenediisocyanate, 1,6-diisocyanato-2,2,4-trimethylhexane, etc.

Poly(oxyalkylene)diols which can be used are particularly the poly(oxytetramethylene)diols and poly(oxypropylene)diols.

Higher triols or polyols which can be used are particularly 1,1,1-tris(hydroxymethyl)propane, 1,2,6-hexanetriol, etc.

Diols which can be used are particularly 1,4-butanediol, ethylene glycol, diethylene glycol, hexamethylene glycol, etc. The preferred diol is 1,4-butanediol.

As catalyst, one can use particularly a salt of a polyvalent metal such as mercury, tin, or lead. Examples of preferred catalysts are phenylmercuric acetate, phenylmercuric oleate, mercuric octoate, dibutyltin dilaurate, dibutyltin diacetate, lead octoate, lead oleate, and other similar compounds. Phenylmercuric acetate is preferred.

The presence of a catalyst, such as phenylmercuric acetate, also offers the advantage of minimizing the reaction of the diisocyanate with humidity.

The thermosetting polyurethane compositions of this type nevertheless give, after curing, thermoset polyurethanes whose elastic modulus at 100% is relatively high, for example, 1.4 MPa and more.

The applicants have found that it is possible to lower the elastic modulus of the thermoset polyurethane by incorporating in the polyurethane composition a small quantity of a chain termination agent suitable for limiting the density of crosslinking of the final polyurethane. As chain termination agent, it has been found to be advantageous to use $C_6$ to $C_{12}$ aliphatic monoalcohols, such as hexanol, n-octanol, etc. The preferred alcohol is n-octanol. One could, however, use other monofunctional chain termination agents such as aliphatic monoalcohols containing an ether function in their molecule, such as methyl Cellosolve, marketed by the company Allied Chemical, or aliphatic monoamines. The quantity of chain termination agent to be incorporated depends on the thermosetting polyurethane composition which is to be modified. Simple tests allow one to determine easily the quantity of chain termination agent to be added in each case in order to obtain the desired elastic modulus in the final thermoset polyurethane. In general, at least 2% by weight will be required.

The connection of the glass element, which is possibly covered with a polarizing layer, with the element made of plastic material can be produced easily, for example, by positioning a spacing element in the vicinity of the edge of the surface of the glass element intended to face the plastic element; subsequently depositing on said surface of the glass element a suitable quantity of the thermosetting polyurethane composition; and thereafter bringing together the glass element and the plastic element until the latter can rest on the spacing component, thus forcing the thermosetting composition to spread and to completely fill the space between the glass element and the plastic element. It is then sufficient to heat the resulting assembly in order to cure the thermosetting composition. Temperatures on the order of 100° C. applied for 1 to 3 hours are usually satisfactory for producing suitable curing. These conditions of temperature and duration are nevertheless in no way critical and are given on a purely illustrative basis.

The intermediate layer of thermoset polyurethane adhesive serving to connect the glass element to the plastic element must be sufficiently thick to "box in", without cohesive rupture, the internal deformations to which it is subjected when the composite lens is subjected to temperature variations because of the different expansion coefficients of the glass and the plastic material. It must, therefore, be sufficiently thick to limit the mechanical stresses exerted on the thin glass element under which said element can bear without breaking; the maximum acceptable stress depends, in turn, on the thickness of the glass element, and the stress exerted is also a function of the diameter of the composite lens, not to speak of the possible influence later of the mounting operation during which the plastic element is mounted. Another important factor is that of the radius of curvature of the elements to be assembled. As this radius of curvature decreases, the induced stresses increase. It is therefore not possible, taking into account the number of factors to be considered, to indicate a precise lower thickness limit for the thermoset polyurethane adhesive layer. It has been found, nevertheless, that when the glass element has a thickness of at least about 0.75 mm and preferably on the order of 0.8 to 1.25 mm, a thickness of thermoset polyurethane adhesive of at least 0.15 mm, preferably 0.2 to 0.4 mm, and most preferably on the order of 0.3 mm, gives satisfactory results. Larger thicknesses for both the glass element and the adhesive can be used, but are not normally desired, given that the total thickness of the composite lens is preferably kept to a minimum for obvious esthetic reasons.

In order to obtain suitable cohesion of the thermoset polyurethane layer to the glass element, it will usually be necessary to pretreat the surface of the glass element with an adhesion promoter, as is well known. The adhesion promoters are usually coupling agents of the monofunctional silane type. Examples of such a promoter are particularly epoxyalkylalkoxysilanes such as glycidoxypropyltrimethoxysilane (sold under the commercial designation A187 by the company Union Carbide, Danbury, Conn.). As a variant, instead of pre-treating the surface of the glass element with the adhesion promoter, the latter can be incorporated in the thermosetting polyurethane composition before being put in contact with the glass element or the polarizing layer carried, if applicable, by said glass element.

The thin glass element will most often be a thin glass element with uniform thickness, for example, 0.8 to 1 mm, and with uniform curvature called "plano" glass, that is to say, with no optical power. It can consist particularly of a photochromic glass or a tinted glass. It can be a photochromic or not "plano" glass covered with a polarizing layer as indicated above. The case in which the "plano" glass is both photochromic and covered with a polarizing layer is a particularly advantageous embodiment. The glass element could, nevertheless, be a lens or a lens preform made of glass. The plastic element can be a lens or a lens preform whose surface intended to face the glass element is preformed to the desired curvature and whose other surface is intended to be machined later; that is to say, once the composite lens is produced.

The composite lenses of the invention thus produced behave well in tests of resistance to atmospheric agents, of temperature cycling, and of resistance to boiling water. These tests were the following:

Test of Resistance to Atmospheric Agents

This test consisted of maintaining the composite lens samples in a climatic enclosure at 50° C. and 98% relative humidity for 4 weeks.

Temperature Cycling Test

This test consisted of putting the composite lens samples for 4 weeks in an enclosure in which the temperature varied from −40° to +80° C. coming back to −40° C. in the space of 2 hours.

Test of Resistance to Boiling Water

This test consisted of putting the samples in a water bath at room temperature, which was progressively brought to a boil, and of then keeping the samples for 2 hours in the boiling water.

Nevertheless, it was observed that certain composite lens samples, when they were mounted in metallic glasses frames and subjected to the aforementioned tests, showed signs of delamination (microvoids) at the interface between the thermoset polyurethane adhesive layer and the glass element, because of insufficient adhesion of the thermoset polyurethane to the surface of the glass and degradation of the capacity of elongation of the thermoset polyurethane at high temperature.

The applicants found that it was possible to remedy this defect by coating the surface of the glass element intended to be in contact with the thermoset polyurethane with a thin layer of optical quality thermoplastic polyurethane having an elongation at rupture of at least 200% before bonding the glass elements and the plastic elements using the thermosetting polyurethane composition as described above.

As thermoplastic polyurethane, one can use segmented, optical quality, thermoplastic polyurethanes with hard and soft segments having an elongation at rupture of at least 200% obtained by polymerization of an entirely aliphatic diisocyanate, a poly(oxyalkylene)-diol with a molecular weight of approximately 600 to 3500, and a diol as chain elongation agent in the presence of an appropriate catalyst.

Examples of diisocyanates, poly(oxyalkylene)diol, and useful catalysts are those already claimed for the thermosetting polyurethane compositions.

Examples of diols which can be used are 1,4-butanediol, ethylene glycol, diethylene glycol, hexamethylene glycol, etc.. 1,4-butanediol is the preferred diol.

These polyurethanes have the property of having very good adhesion to glass, in particular when one uses an adhesion promoter of the monofunctional silane coupling agent type. Silanes which can be used for this purpose are particularly aminoalkylalkoxysilanes such as gamma-aminopropyltriethoxysilane (sold under the designation A1100 by the company Union Carbide). They also give very good adhesion to the thermoset polyurethanes described above. This adhesion promoter can be applied previously to the surface of the glass element or on the polarizing layer carried, if applicable, by the latter, or can be incorporated in the thermoplastic polyurethane composition before its application to the surface of the glass element.

The thermoplastic polyurethane needs only to be applied to the glass element in a very thin layer, given that its role is only to improve the bond between the thermoset polyurethane layer and the glass element. In other words, one only need make use of its interfacial properties and not its mass properties which are not suitable for solving the problem mentioned because of its relatively high elastic modulus at room temperature and its mediocre cohesion at high temperature and at a high degree of humidity.

As an indication, it was found that the thickness of the thermoplastic polyurethane layer should be at least 5 μm, but will advantageously be kept lower than approximately 20 μm, preferably 10 to 15 μm, in order to obtain good results.

The thermoplastic polyurethane composition can be applied in a very small thickness on the glass element, for example, by coating by centrifugation, or in a form diluted in a solvent by any conventional technique of application (brushing, dipping, spraying, etc.), or else using a very thin solid film.

Prior Art

European Patent Specification No. 0077168 (Bognar et al.) is directed to the production of three-layer, laminated ophthalmic lenses comprising an outer ply of glass and an inner layer of an optically transparent, thermosetting polyurethane bonded to the glass through a thin layer of an optically transparent, thermoplastic polyurethane. There is no mention of CR39® lenses or of a thermoset adhesive.

European Patent Application No. 0116924 (Sare et al.) discloses the fabrication of three-layer, laminated ophthalmic lenses comprising a glass sheet, a transparent thermoset resin (one example being CR39®), and a thermoplastic adhesive providing bonding therebetween. There is no mention of a thermoset adhesive.

U.S. Pat. No. 4,268,134 (Gulati et al.) describes the preparation of three-layer, laminated ophthalmic lenses comprising a layer of glass placed between two layers of transparent polymers, the polymer layers being bonded to the glass via thermoplastic or thermosetting polymers. That lens structure is far removed from the present invention.

U.S. Pat. No. 4,592,947 (Hunter et al.) is concerned with three-layer laminated articles (ophthalmic lenses are not mentioned) comprising a layer of cured polyurethane (most preferably a thermoplastic polyurethane) sandwiched between two other layers of materials; materials which can be the same or different and which are selected from the group of glass, ceramic, and plastic. The elastic modulus of the polyurethane was greater than 1; hence, outside of the value required in the present invention.

U.S. Pat. No, 4,793,703 (Fretz, Jr.) is drawn to three-layer, laminated ophthalmic lenses comprising a thin layer of glass bonded to a relatively thick, organic plastic layer via an organic adhesive, the power of the lenses resulting from the curvature placed in the rear surface of the plastic layer. The patentee explicitly excludes CR39® for use in the laminated lenses, using instead plastics exhibiting much lower thermal expansions with specific reference to epoxy resins.

U.S. Pat. No. 4,857,407 (Coleman et al.) claims a three-layer laminated article (an ophthalmic lens is nowhere mentioned) comprising a thermoplastic polyurethane layer sandwiched between two layers of rigid materials; materials which can be the same or different and which are selected from the group of glass and plastic materials. No reference is made to a thermoset adhesive.

U.S. Pat. No. 5,064,712 (Fretz, Jr.) discloses an improvement upon the three-layer composite lenses of U.S. Pat. No. 4,793,703, supra, but again describes the use of epoxy resins as a relatively thick, organic plastic layer.

U.S. Pat. No. 5,116,684 (Fretz, Jr. et al), U.S. application Ser. No. 07/624,055, filed Dec. 7, 1990 by R. S. Herndon et al. under the title COMPOSITE ARTICLE AND METHOD, now U.S. Pat. No. 5,139,857, U.S. application Ser. No. 07/682,479, filed Apr. 8, 1991 by D. Dasher et al. under the title HIGH INDEX, ORGANIC LENS MEMBER, now U.S. Pat. No. 5,223,862, and U.S. Ser. No. 07/822,863 filed Jan. 21, 1992 by D. Dasher et al. under the title OPHTHALMIC LENS METHODS, now U.S. Pat. No. 5,232,637, disclose the production of composite lenses comprising a thin glass element adhesively bonded to a relatively thick, organic plastic member, the organic plastic member being a resin having a coefficient of thermal expansion much lower than CR39® and the adhesive normally being a thermoplastic resin.

DESCRIPTION OF PREFERRED EMBODIMENTS

The following non-limiting examples are given for the purpose of illustrating the present invention.

In the examples which follow, the glass element consisted of a PEG (PHOTOGRAY EXTRA®) glass element of the company Corning Incorporated, Corning, N.Y., with constant thickness equal to 0.8 or 1.0 mm depending on the case, whose curvature was the same as that of the surface of the plastic element intended to face it. The surface of this glass element was treated before being bonded to the adhesive layer with an adhesion promoter which was either gamma-aminopropyltriethoxysilane (A1100 of Union Carbide) or glycidoxypropyltrimethoxysilane (A187 of Union Carbide).

In both cases, the mode of operation was the following:

A 1 wt % solution of silane in ethanol containing 1 wt % water was prepared. This solution was allowed to age for 3 hours in order to promote hydrolysis of the silane; then it was applied to the glass element by centrifugation. The glass element treated in this way was finally placed for 2 hours in an oven at 100°–105° C. in order to facilitate condensation of the hydrolysed silane.

The plastic element consisted of a finished lens, a semi-finished lens, or a lens preform of which only the surface intended to be bonded to the thermoset polyurethane adhesive was finished, depending on the case. The plastic material of these elements was poly(diethylene glycol bis(allyl carbonate)) (CR39® of PPG Industries). The thickness of the plastic element was between 8 and 10 mm depending on the case.

EXAMPLE 1

This example illustrates the possibility of reducing the elastic modulus of the thermoset polyurethane by addition of a small quantity of an aliphatic monoalcohol to the starting thermosetting polyurethane composition.

To a thermosetting polyurethane composition of optical quality sold in commerce under the commercial designation DTPU 10394 by the company in CONAP, Olean, N.Y., in the form of two parts A and B to be mixed before use, various proportions of n-octanol were added. Parts A [based on 4,4'-methylene-bis(cyclohexylisocyanate)] and B [based on poly(oxyalkylene)diol] were mixed in a weight ratio of 10/4.06. The resulting mixed composition was heated to 100° C. for 2 hours in order to produce a thermoset polyurethane in the form of a plate from which test pieces were cut out on which the elastic modulus at 100% elongation was measured. The results obtained as a function of the proportion of n-octanol added are given in Table I hereafter.

TABLE I

| SAMPLE | n-OCTANOL ADDED IN WT % WITH RESPECT TO THE COMPOSITION | ELASTIC MODULUS AT 100% ELONGATION, IN MPa | ELONGATION AT RUPTURE |
|---|---|---|---|
| A | 0 | 3.04 | 150 |
| B | 1 | 2.21 | — |
| C | 2 | 1.38 | — |
| D | 3 | 0.86 | — |
| E | 3.8 | 0.69 | 200 |
| F | 4 | 0.55 | — |
| G | 4.1 | 0.52 | 200–220 |
| H | 5 | 0.35 | — |
| I | 5.2 | 0.21 | 350 |
| J | 6 | 0.17 | — |

EXAMPLE 2

Similar experiments to those of Example 1 were done with a thermosetting polyurethane composition similar to that of Example 1, except that part B contained poly(oxypropylene)diol and the weight ratio of the mixture of parts A and B was 7.5/2.5 (product provided by the company SAMI, Malesherbes, France). Moreover, 0.25 wt % phenylmercuric acetate was added as catalyst. The resulting composition was heated to 90° C. for 3 hours with degassing by application of a vacuum.

The results obtained are given in Table II hereafter.

TABLE II

| SAMPLE | n-OCTANOL ADDED IN WT % WITH RESPECT TO THE COMPOSITION | ELASTIC MODULUS AT 100% ELONGATION, IN MPa | ELONGATION AT RUPTURE |
|---|---|---|---|
| K | 0 | 3.00 | 240 |
| L | 1.25 | 1.66 | — |
| M | 2.50 | 0.59 | 350 |
| N | 3.50 | 0.24 | 440 |
| O | 4.00 | 0.13 | — |
| P | 4.50 | 0.055 | 600 |
| Q | 5.00 | 0.02 | 900 |

It results from these experiments of Examples 1 and 2 that it is possible to reduce the elastic modulus of a thermoset polyurethane to a desired value by addition of a suitable small quantity of a chain termination product.

EXAMPLE 3

From the thermoset polyurethane compositions serving for the preparation of Samples E, G, and I of Example 1, 70 mm diameter lenses were prepared, consisting of a PHOTOGRAY EXTRA ® photochromic glass element 1.0 mm thick and plastic lens preforms consisting of CR39 ®, approximately 8.5 mm thick. The radii of curvature of the glass element and of the surface of the plastic lenses intended to be connected with the glass element were 89.5 mm. The surface of the glass element was treated previously with silane A187 as described above. The thickness of the thermoset polyurethane layer was 0.3 mm, and this layer was obtained by hardening the polyurethane composition at 100°-110° C. for 2 to 3 hours in an oven. After lamination, the plastic preforms were machined in order to obtain composite lenses with a power of +3.5 diopters or −3.5 diopters, depending on the case.

The composite lenses obtained were subjected to the tests described above. These tests and the results obtained are given in Table III hereafter.

One sees that the lenses prepared using the polyurethane M, N, and O, with elastic modulus values within the limits of the invention, present a good resistance to boiling water for 2 hours or more.

A resistance to boiling water of 2 hours or more means that the composite lens can be subjected to a tinting operation with no damage.

The lenses 8, 9, and 10 also pass the test of resistance to atmospheric agents described above.

However, it was observed that certain of the lenses 1–12 of Examples 1 and 2, when they were kept at room temperature and at 0% relative humidity after the tests, displayed microvoids due to delamination of the polyurethane at the interface between it and the glass element.

EXAMPLE 5

Composite lenses of 70 mm diameter were prepared consisting of PHOTOGRAY EXTRA ® glass element 1 mm thick and a pre-machined lens preform made of CR39 ® plastic material approximately 8.5 mm thick with a frontal power of 6 to 9 diopters, depending on the case. The glass element and the adjacent surface of the preform had a radium of curvature of 89.5 mm. The surface of the glass element intended to be adjacent to

TABLE III

| LENS | THERMOSET POLYURETHANE ADHESIVE | POWER OF THE COMPOSITE LENS | BOILING WATER | TEMPERATURE CYCLE | RESISTANCE TO ATMOSPHERIC LENS |
|---|---|---|---|---|---|
| 1* | I | +3.50 | + | + | + |
| 2** | G | +3.50 | + | + | + |
| 3** | G | −3.50 | + | + | + |

"+" means that the composite lens passes the test
* composite lens not mounted on a frame
** composite lens mounted on a metallic frame supported on the plastic element of the composite lens

EXAMPLE 4

Composite lenses of 70 mm diameter were prepared from thermosetting polyurethane serving for the preparation of Samples K to Q of Example 2. These lenses consisted of a PHOTOGRAY EXTRA ® glass element 0.8 mm thick and a CR39 ® lens 8.5 mm thick, which were bonded together by a 0.30 mm thick layer of polyurethane by heating to 100° C. for 2 hours in an oven. The radii of curvature of the glass element and of the plastic preform surface adjacent to the glass element were 89.5 mm. The surface of the glass element adjacent to the CR39 ® lens was pretreated with silane A187. The composite lenses obtained, without being mounted in a frame, were immersed in boiling water for 240 minutes. The time of occurrence of a break in the glass element was noted. The results are given in Table IV below.

TABLE IV

| LENSES | THERMOSET POLYURETHANE ADHESIVE | TEST W/BOILING WATER, TIME OF OCCURRENCE OF BREAKS, IN MIN. |
|---|---|---|
| 4 | K | 50 |
| 5 | L | 80 |
| 6 | M | 120 |
| 7 | N | Nothing |
| 8 | O | Nothing |
| 9 | P | * |
| 10 | Q | * |

"Nothing" means that no break of the glass element was observed after the 240 min of the test.
* means that cohesive delamination of the composite lens occurred.

the preform was pretreated with silane A1100. the pretreated surface of the glass element was covered with a layer of thermoplastic polyurethane whose thickness is indicated hereafter, and which was cured at 100° C. for 3 hours. The thermoplastic polyurethane composition that was used for this purpose was the following:

Thermoplastic polyurethane composition:
  10 g of poly(oxytetramethylene)diol with a molecular weight of 1000 (Terathane ® 1000 of DuPont)
  5 g of 4,4'-methylene-bis(cyclohexylisocyanate) (Desmodur W of Mobay)
  0.91 g of 1,4-butanediol
  0.03 g of phenylmercuric acetate as catalyst.

The thermoplastic polyurethane obtained from this composition has an elastic modulus at 100% elongation of 3.5 MPa at 20° C. and 0.7 MPa at 80° C.

The glass element covered with the layer of thermoplastic polyurethane was then connected to the lens preform by a layer of thermoset polyurethane 0.30 mm thick, obtained from the composition of thermosetting polyurethane E of Example 1, by heating to 100° C. for 2 hours. Certain ones of the composite lenses obtained were left as they were (semi-finished lenses); others were brought to a power of +3.5 diopters or −3.5 diopters by machining the free surface of the plastic element, and were then mounted in metallic frames (mounted finished lenses). These various lenses were subjected to the tests mentioned above.

The experimental data and the results obtained are given in Table V hereafter.

TABLE V

| LENS | FRONTAL POWER OF THE PREFORMS DIOPTERS | NATURE OF THE THERMOPLASTIC POLYURETHANE μM | *NATURE OF THE LENS OBTAINED | BOILING WATER | TESTS OF RESISTANCE TO ATMOS- PHERIC AGENTS | TEMPERA- TURE CYCLE TEST |
|---|---|---|---|---|---|---|
| 11 | 6 | 10 | Semi-Finished | + | + | + |
| 12 | 6 | 10 | Finished (+3.5 D) + Mounted | + | + | + |
| 13 | 6 | 10 | Finished (−3.5 D) + Mounted | + | + | + |
| 14 | 6 | 60–70 | Semi-Finished | NT | NT | Delamination |
| 15 | 9 | 10 | Semi-Finished | + | NT | NT |

* (Corrective power in diopters)
NT = not tested

One sees that the composite lenses which have a very thin layer of thermoplastic polyurethane intercalated between the thermoset polyurethane layer and the glass element give very satisfactory results in the tests. Moreover, they display no tendency towards delayed formation of microvoids when they are kept at room temperature in a dry atmosphere for a long period of time (1 month or more) after said tests.

In contrast, lens 14, which had a relatively thick layer of thermoplastic polyurethane (60–70 μm), failed the temperature cycle test because, with this thickness, the effect of the excessively high elastic modulus of the thermoplastic polyurethane is felt.

EXAMPLE 6

Composite lenses were manufactured according to the general mode of operation described in Example 5, except that the concave surface of the PHOTOGRAY EXTRA ® glass element used was previously covered with a polarizing coating and subjected to a treatment for the purpose of reducing the solubility in water of this polarizing coating, all as described in test No. 2 in U.S. Pat. No. 4,648,925, supra. The pre-treatment with silane A1100 described in Example 5 was done on the polarizing coating made insoluble, after which the thermoplastic polyurethane layer was applied and the resulting element was bonded to a CR39 ® lens preform by a layer of thermosetting polyurethane, as described in Example 5. Quite obviously, the composite film of polyurethane described in the aforementioned patent was not applied.

The experimental data and results obtained are given in Table VI hereafter.

niques without consequently leaving the scope of the invention.

We claim:

1. A composite lens which includes a glass element having a thickness of at least 0.75 mm connected by a transparent thermoset, polyurethane adhesive layer of optical quality with an elongation at rupture of at least 200% and an elastic modulus in the range from 0.13 to 1.0 MPa at 100% elongation to an element made of poly (diethylene glycol bis (allyl carbonate)) which is a lens for a lens preform.

2. A composite lens according to claim 1, wherein the elastic modulus at 100% elongation of the adhesive is between 0.3 and 0.7 MPa.

3. A composite lens according to claim 1, wherein the transparent adhesive is selected from the group consisting of thermoset, optical quality, segmented polyurethanes with hard and soft segments obtained from a composition of thermosetting polyurethane modified by addition of a chain termination agent, thereby limiting the density of crosslinking and reducing the elastic modulus at 100% elongation of the resulting thermoset polymer to a value from 0.13 to 1.0 MPa.

4. A composite lens according to claim 3, wherein the segmented polyurethanes with hard and soft segments, which are thermosetting and of optical quality, are obtained from a thermosetting polyurethane composition containing (a) an entirely aliphatic diisocyanate, (b) a poly(oxyalkylene)diol with a molecular weight of approximately 600–3500, (c) a triol or polyol, optionally mixed with a diol as a chain elongation agent, (d) optionally, a catalyst, and (e) a chain termination agent.

5. A composite lens according to claim 4, wherein the

TABLE VI

| LENS | FRONTAL POWER OF THE PREFORMS DIOPTERS | NATURE OF THE THERMOPLASTIC POLYURETHANE μM | *NATURE OF THE LENS OBTAINED | BOILING WATER | TESTS OF RESISTANCE TO ATMOS- PHERIC AGENTS | TEMPERA- TURE CYCLE TEST |
|---|---|---|---|---|---|---|
| 16 | 6 | 12 | Semi-Finished | + | + | + |
| 17 | 6 | 12 | Finished (+3.5 D) + Mounted | + | + | + |
| 18 | 6 | 12 | Finished (−3.5 D) + Mounted | + | + | + |

* (Corrective power in diopters)

It goes without saying that the embodiments described are only examples and that they can be modified, particularly by substitution of equivalent techniques.

chain termination agent is a $C_6$ to $C_{12}$ aliphatic monoalcohol.

6. A composite lens according to claim 5, wherein the monoalcohol is n-octanol.

7. A composite lens according to claim 4, wherein it also includes a layer of thermoplastic segmented polyurethane with hard and soft segments having a thickness of at least 5 μm, which is applied between the glass element and the thermoset polyurethane layer.

8. A composite lens according to claim 4, wherein the surface of the glass element is pretreated within adhesion promoter of the monofunctional silane type prior to being connected to said element made of poly(diethylene glycol bis(allyl carbonate)).

9. A composite lens according to claim 7, wherein the thermoset polyurethane adhesive layer in contact with the surface of the glass element contains an adhesion promoter of the monofunctional silane type.

10. A composite lens according to claim 7, wherein the thermoplastic polyurethane layer in contact with the surface of the glass element contains an adhesion promoter of the monofunctional silane type.

11. A composite lens according to claim 1, wherein the thickness of the transparent adhesive layer with an elastic modulus between 0.13 and 1.0 MPa is between 0.20 and 0.40 mm.

12. A composite lens according to claim 7, wherein the layer of thermoplastic segment polyurethane has a thickness of at most 20 μmm.

13. A composite lens according to claim 1, wherein the surface of the glass element turned towards the transparent adhesive layer has a polarizing layer interposed between said surface and said adhesive layer.

* * * * *